(12) United States Patent
Georgiev

(10) Patent No.: US 7,411,595 B2
(45) Date of Patent: Aug. 12, 2008

(54) TOOL FOR EXTRACTING AND MANIPULATING COMPONENTS OF WARPING TRANSFORMS

(75) Inventor: Todor G. Georgiev, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1273 days.

(21) Appl. No.: 09/996,200

(22) Filed: Nov. 28, 2001

(65) Prior Publication Data

US 2003/0098872 A1 May 29, 2003

(51) Int. Cl.
*G09G 5/00* (2006.01)
(52) U.S. Cl. ..................... 345/644; 345/647
(58) Field of Classification Search ............... 345/646, 345/647, 648, 473, 644, 650, 661; 382/296, 382/301
See application file for complete search history.

(56) References Cited

U.S. PATENT DOCUMENTS

| | | | | |
|---|---|---|---|---|
| 5,067,019 A | * | 11/1991 | Juday et al. | 348/580 |
| 5,208,872 A | * | 5/1993 | Fisher | 382/300 |
| 5,731,819 A | * | 3/1998 | Gagne et al. | 345/647 |
| 6,157,747 A | * | 12/2000 | Szeliski et al. | 382/284 |
| 6,157,750 A | * | 12/2000 | Choi et al. | 382/301 |
| 6,208,360 B1 | * | 3/2001 | Doi et al. | 345/474 |
| 6,215,915 B1 | * | 4/2001 | Reyzin | 382/296 |
| 6,252,608 B1 | * | 6/2001 | Snyder et al. | 345/473 |
| 6,389,154 B1 | * | 5/2002 | Stam | 382/108 |
| 6,525,735 B1 | * | 2/2003 | Maillot | 345/473 |
| 6,608,631 B1 | * | 8/2003 | Milliron | 345/647 |
| 2002/0085003 A1 | * | 7/2002 | Nagashima | 345/441 |

OTHER PUBLICATIONS

"Animating direct manipulation interfaces", Thomas et al, Proceedings of the 8th annual ACM symposium on User interface an software technology Dec. 1995, p. 3-12.*
"Stretching the rubber sheet: a metaphor for viewing large layouts on small screens", Sarkar et al., Proceedings of the 6th annual ACM symposium on User interface software and technology Dec. 1993, p. 81-91.*
"Skeletal strokes", Hsu et al., Proceedings of the 6th annual ACM symposium on User interface software and technology Dec. 1993, p. 197-206.*
"A survey of image registration techniques", L. Brown, ACM Computing Surveys (CSUR) Dec. 1992, p. 325-376.*
"Expanders obtained from affine transformations", Maruo ka amd Jimbo, Proceedings of the seventeenth annual ACM symposium on Theory-of computing Dec. 1985, p. 88-97.*
"Computer Graphics—Principles and practice", Foley et al., Addison-Wesley. Jul. 1997, p. 206, 1104, 1108-1109.*
"Kai's SuperGoo—Version 1.5," ScanSoft™, www.scansoft.com, 1999.

* cited by examiner

*Primary Examiner*—Ryan Yang
(74) *Attorney, Agent, or Firm*—Fish & Richardson P.C.

(57) ABSTRACT

Methods and products are disclosed concerning extraction of selected components of a warping of an image. Given a warped image and a distortion grid, the distortion at any point in the image may be viewed locally as a displacement and a linear transform. The linear transform can be manipulated to extract elements of the local distortion such as skew, rotation, magnification and combinations. The selected components may then be selectively applied at other locations of the same or a different image, using a variety of virtual paintbrushes for different effects.

77 Claims, 3 Drawing Sheets

| $A_{42}$ | $B_{44}$ |
|---|---|
| $C_{46}$ | $D_{48}$ |

TOOL FOR EXTRACTING AND MANIPULATING COMPONENTS OF WARPING TRANSFORMS

TECHNICAL FIELD

This invention relates to digital image manipulation, and more particularly to warping.

BACKGROUND

With the advent of digital photography, the desire has grown to be able to manipulate the images produced. A user may wish simply to enhance an image, or to distort it for a visual effect, or to touch-up the image. A variety of computer programs exist (such as Adobe® Photoshop®) designed to aid a user to alter an image. Such alterations can include a variety of distortions, such as a swirling effect, or magnification of certain areas of an image, or stretching portions of an image. Other distortions are common.

A distortion may be thought of as a grid of vectors (the "distortion grid,") with each vector corresponding to a single point in an image. The vectors indicate how the image is modified to obtain the original, undistorted source image. The source image itself may consist of a grid of vectors each with zero length (as well as other information, such as color). The image with the distortion applied is the "destination image."

As distortions are sequentially applied, they are summed in the distortion grid. What exists in the distortion grid is only the sum of all previous distortions, without the history of the individual distortions themselves.

Once the distortion grid is satisfactory to a user (who typically sees the distorted image on a graphical display device while working on it) the user may elect to accept the changes. Once that is done, typically, the distorted image in effect replaces the original, and the information regarding the distortions (i.e. the sum of the distortions) is lost. If the user elects not to accept the distortion, the original image is preserved and the distortion grid discarded.

SUMMARY

In one aspect, the invention includes a method for responding to a user action selecting an area in an image related to an area in a distortion grid, and using two or more points local to the area, extracting one or more components of the local distortion. The method may include exctracting displacement, rotation, magnification, skew, directional scaling or combinations. In another aspect, the method includes calculating an afine transform from the local points and may also include decomposing the affine transform into one or more components of a warping. The extraction may include calculating a determinant of a resulting linear transform matrix representing a linear transform derived from the affine transform to obtain rotation, or using eigenvalues of the linear transform matrix to obtain scaling. Rotation or skew may be removed prior to extraction of scaling.

In another aspect of the invention, a user can select desired components to be extracted from an on-screen menu, and may further select the area from which to extract the selected component(s) using a virtual paintbrush.

In yet another aspect, the selected component(s) of the warping may be applied by using a virtual paintbrush to the source image or to another image.

In another aspect, the invention includes a computer program product to accomplish the extraction and other aspects described above.

In one aspect, there is described a computer program product, disposed in a computer readable medium, having instructions to cause a computer to use a plurality of points surrounding a first area of an image related to an area in a distortion grid, calculate at least one component of a distortion at the first area, and apply the at least one component of the distortion to a second area of the image.

In another aspect, there is described a computer program product having instructions stored in a computer readable medium, containing instructions to cause a computer to display a first image on a canvas, and responsive to an input device controlled by a user, select an area of the first image, and responsive to a selection by the user from a menu, extract at least one component of a distortion from the area, and responsive to movement and location of a cursor controlled by a user, apply the at least one component to a second area of the first image.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
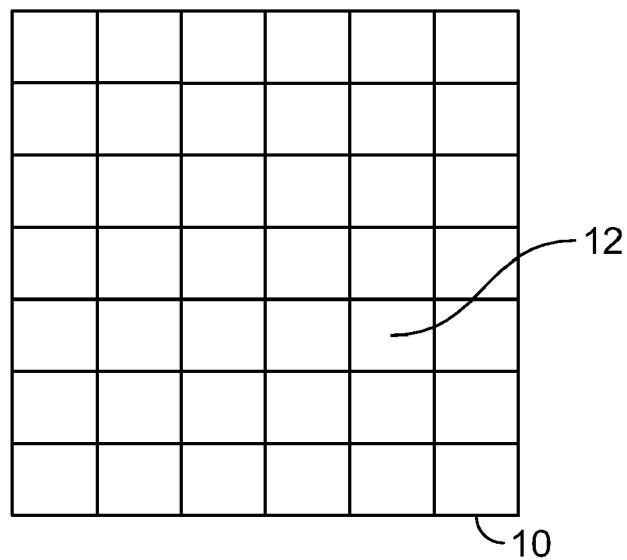
FIG. 1 is a diagram of a distortion grid and an image grid.
Figure 1:
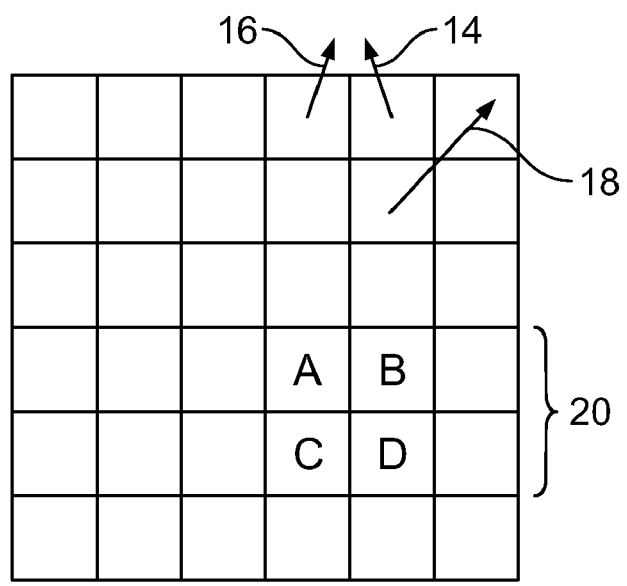

A distortion can be viewed as a smooth mapping from the image plane of the source image to the image plane of the destination image. We define this mapping by the distortion grid on the destination image. A distortion can be very complex. However, because it is a smooth mapping, any distortion may be viewed locally as an affine transform, consisting of a translation and a linear transform. The affine transform can be further decomposed into elements or components of a distortion such as translation, magnification, rotation, directional scaling and skew (also referred to as shear.) It is desirable to perform this decomposition because these components are more intuitive for a user. A user need not know mathematics to understand the effect of a rotation, or what an affine transform is to know the user wants a magnification.

Having created a distortion of an image, a user may wish to use selected components of a distortion in a given area of an image, and apply those selected components elsewhere. The user may wish to keep only the rotation, or the scaling, or to spread the existing local distortion over a wider area. The present invention enables a user to select easily one or more components of a distortion local to a point, and using a virtual paintbrush, apply the selected components elsewhere. ("Local to a point" means adjacent to, or within a few pixels of, the point. The farther away, the less it is local to a point.) Alternatively, the user can select components of a distortion and remove them using the virtual paint brush.

A distortion (the warping transform) may well have resulted from a complex sequence of distortions no one of which corresponds to any of the final decomposition elements. While the local distortion at a point may be decomposed into a specific set of components, it cannot be determined how the distortion at that point was in fact created.

A virtual paintbrush can be implemented with a cursor manipulated by a mouse or other input device, which causes the cursor to be moved about a computer display screen over an image, a virtual "canvas", and thereby applies an effect to the image. The user may typically select from among a variety of brush shapes, e.g., circle, square, or single pixel. The user drags the brush along a "trajectory" from one location to another within the image, thereby defining an "envelope." Pixels within the envelope are affected by the operation of the brush. One type of brush allows a user to "paint" colors and textures into the envelope. The paint brush replaces the pixels in the envelope with the image of the brush. Other effects may also be applied with a brush, such as a warping.

It is desirable that the control of a distortion and the manipulation of an image be intuitive and simple. Adobe Photoshop offers a virtual paintbrush that is movable about an image by a user manipulating a mouse. In an exemplary implementation, a computer program to edit images enables a user to select components of a distortion the user desires to manipulate by checking boxes on a menu. Other selection methods may also be used beneficially. Having selected the desired component(s) the user may then select a point in the distorted image (corresponding to an element of the distortion grid) by moving a cursor to the desired point, then mouse click over the point to extract the selected component(s).

The selected components may then be applied by moving the virtual paintbrush around the distorted image, adding or subtracting out the selected components. In this implementation, the paintbrush can have a variety of shapes and application functions affecting how the application is effected, as described in greater detail below.

FIG. 1 shows an image 10 with a pixel 12. The image may be thought of as being associated with zero distortion vectors (representing no distortion).

FIG. 1 further shows a distortion grid, of the same size as the image, but having non-zero distortion vectors 14, 16, 18 in the grid. At each point these vectors represent the sum of the distortions applied to the image.

Figure 2:
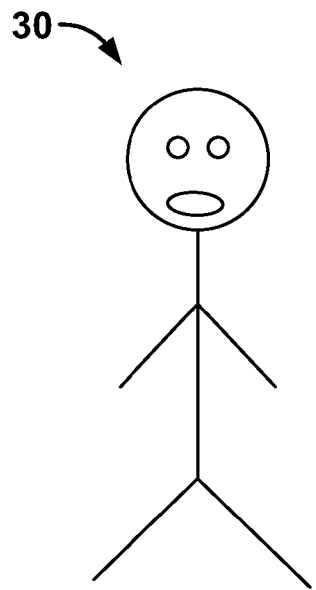
FIG. 2 is a diagram of an original image and a distorted image.
Figure 2:
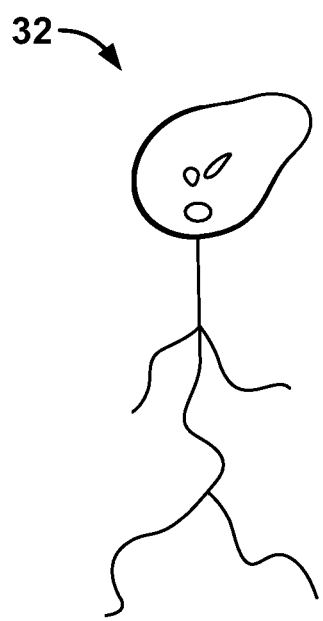

FIG. 2 shows an original image 30 and a distorted (warped) image 32. The distorted image may have been created by dragging portions of the head and neck upward and to the right, and rotating parts of the body. In fact, it was created by a combination of steps, including stretching, compressing, and swirling portions of the image. It is not so important to know exactly how the distortion was created, but rather to note that the distortion at any point in the image may be viewed locally as a combination of a translation and a linear transform.

Figures 3, 4:
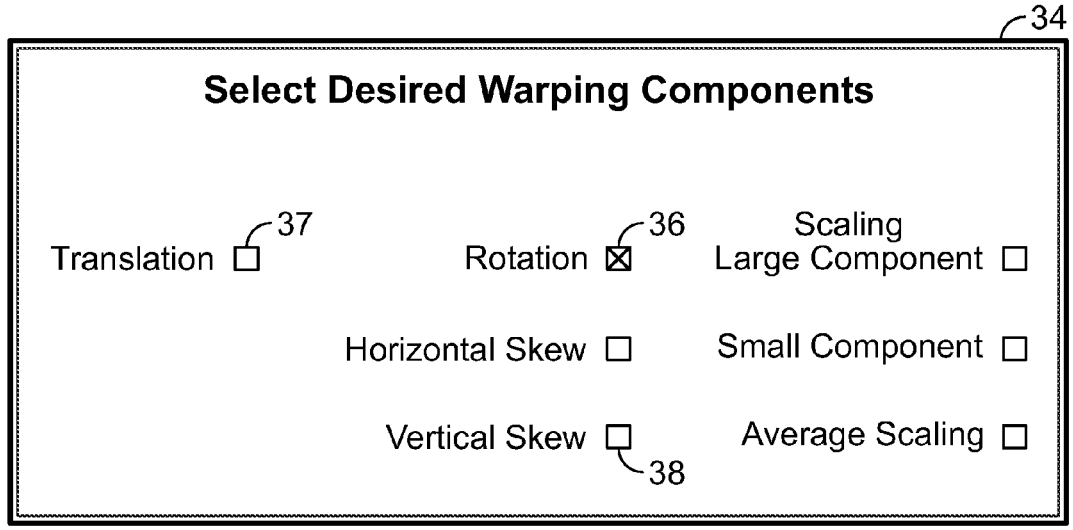
FIG. 3 shows a menu selection screen.
FIG. 4 is a diagram of a portion of a distortion grid.
Like reference symbols in the various drawings indicate like elements.

Suppose a user wishes to obtain just the rotational component of the distortion at one area of the distorted image. FIG. 3 shows a sample menu selection screen 34 that a user can employ to select just the desired elements of a warping, in this case selecting only the rotation 36. Other selectable elements shown include translation 37 and vertical skew 38. Other menu items are available.

Having selected the desired elements of a distortion, the user can cause the mouse cursor to hover over the area of the distorted image from which the user desires to draw the selected distortion components. Clicking the mouse at that point causes the selected components of the distortion in the area of that point to be extracted.

FIG. 4 shows four elements 40 of a distortion grid. (For ease of visualization, the vectors at each element are not shown.) Suppose the user's selected point is A 42. This point has nearby points B 44, C 46 and D 48 local to point A 42. (Other local points could have been used, such as points above A or to the left of A. Any points which are all local (i.e. within a small area) to the selected point A 42 may be used.

The warping transform at a small area local to a point can be approximated by an affine 0transform. The affine transform has two parts: displacement and linear transform. The displacement can be taken as the original vector at point A 42. This is similar in effect to choosing the vector at any of the other local points B 44, C 46 or D 48, or more complex approaches such as averaging local vectors, but using a single point is sufficient and faster.

The distortion vector at any local point can be represented as the displacement vector at that point plus a linear transformation of the vector $\vec{V}=(u, v)$ that starts from A 42 and ends at that point. The linear transformation is represented by a 2×2 matrix $M_0$:

$$M_0 = \begin{pmatrix} a & b \\ c & d \end{pmatrix}$$

and it is the same when calculating all corners A 42, B 44, C 46 and D 48 in the same small local area. Given the distortion vectors at the four points, we find $M_0$ by solving $$\vec{D}=\text{(Displacement at point A)}+M_0 \cdot \vec{V} \quad \text{EQUATION 1}$$

for points B 44 and C 46.

The total distortion vector at a point is represented by $$\vec{D} = \begin{pmatrix} Dx \\ Dy \end{pmatrix}$$

In the exemplary implementation described here, $$\vec{V} = \begin{matrix} u \\ v \end{matrix}$$

is the vector from point A 42 to the points B 44 or C 46. Point D 48 or other local points can also be used, but doing so can result in more complex calculations, including averaging out among any number of points.

Now, finding the matrix $M_0$ is easy:

The vector pointing to B 44 is the vector $\vec{V}=(1, 0)$

The vector pointing to C 46 is the vector $\vec{V}=(0, 1)$ (choosing the y-axis pointing down)

To simplify notation, we call the total displacement vector $\vec{D}$ at point A 42 simply $\vec{A}$ with components Ax and Ay, and similarly for the total displacement at B 44 and C 46.

If we substitute those into EQUATION 1 we get:

$a=Bx-Ax$ $b=Cx-Ax$ $c=By-Ay$ $d=Cy-Ay$

The final result of extracting the Affine Transform is the location (x,y coordinates) of the selected point A 42, the displacement vector at this point and the local matrix $M_0$.

Having determined the Affine Transform, we may extract from it a new $M_x$ which has only a selected component of the local distortion, such as rotation or magnification. The selected component matrix is given the subscript m for magnification, r for rotation and so forth.

1. Extract Displacement Only:

From equation 1, we need simply imply let $M_0=1$ and use only the displacement component.

2. Extract Magnification Only

Calculate the determinant of $M_0$:

$$det = a \cdot d - b \cdot c$$

If the determinant is less than zero, then there is a reflection, which must first be dealt with as discussed below. A determinant of exactly zero results in a single point, hence is not encountered in application.)

If the determinant is greater than zero, we set $$M_m = \begin{pmatrix} s & 0 \\ 0 & s \end{pmatrix}$$

Where $s = \sqrt{det}$

3. Extract Rotation

If the determinant is less than zero, then there is a reflection, which must first be dealt with as discussed below.

If the determinant is greater than zero: calculate the angle $\phi$:

$$\phi = \arctan\left(\frac{b-c}{a+d}\right)$$

Alternatively, $\phi$ may be calculated:

$$\phi = \frac{\arctan\left(\frac{-b}{a}\right) + \arctan\left(\frac{-c}{d}\right)}{2} \quad \text{Equation 2}$$

$$M_r = \begin{pmatrix} \cos(\phi) & \sin(\phi) \\ -\sin(\phi) & \cos(\phi) \end{pmatrix}$$

4. Extract Rotation and Magnification $M_{rm}$ is the product (matrix multiplication) of the rotation matrix $M_r$ and the magnification matrix $M_m$.

5. Handling Reflection

If the determinant of $M_0$ is less than zero, we know there is a reflection. We approach this case in a special way:

First we remove the reflection by multiplying $M_0$ by the inverse reflection matrix $R^{-1}$ $$R^{-1} = \begin{pmatrix} 1 & 0 \\ 0 & -1 \end{pmatrix}$$

so instead of $M_0$ we use $R^{-1} * M_0$.

Then we proceed as above for displacement, magnification, rotation, skew (described below) and combinations of components. In the end, the reflection matrix R is applied to get the resulting $M_1$. (Note that $R^{-1} = R$)

6. Handling Directional Scaling

In this case, there must be no rotation, skew or reflection, that is, $M_0$ must be symmetric. (If any of these components exist, the matrix will not be symmetrical, and they must first be removed, as described above for rotation and below.) Directional scaling is scaling stronger in one direction than in another. Magnification (positive or negative) is equal scaling in all directions.

If $M_0$ is symmetric, it has real eigenvalues. The eigenvalues $\lambda_1$ and $\lambda_2$ may be found by solving the quadratic equation below for x:

$$(a-x)(d-x) - bc = 0$$

Each of the solutions ($\lambda_1$ and $\lambda_2$) is related to an eigenvector $$\vec{W} = \begin{pmatrix} u \\ v \end{pmatrix},$$

which may be
found by solving:

$$M \cdot \begin{pmatrix} u \\ v \end{pmatrix} = \lambda \cdot \begin{pmatrix} u \\ v \end{pmatrix}$$

(where * represents matrix multiplication) Next, each eigenvector is normalized by dividing it by its length $\sqrt{u^2+v^2}$.

Two projection operators P and Q may now be constructed, each represented in terms of the corresponding normalized eigenvector, $\begin{smallmatrix}u\\v\end{smallmatrix}$:

$$P = \begin{pmatrix} u \cdot u & v \cdot u \\ v \cdot u & v \cdot v \end{pmatrix}$$

Q is determined in the same way, using the second eigenvector values.

The result is two eigenvalues, $\lambda_1$ and $\lambda_2$, and two projection matrices, P and Q, and the desired $$M_1 = \lambda_1 \cdot P + \lambda_2 \cdot Q$$

P represents one direction of scaling, and the amount of scaling is $\lambda_1$. Q represents the direction of scaling orthogonal to the direction of $P_1$, and the amount of scaling in that direction is $\lambda_2$.

Visually, applying $M_1$ results in different scaling in each of the two directions, stretching in a given direction and different stretching/shrinking in the orthogonal direction.

The user can select one direction (bigger or smaller) by checking a checkbox) and force the other (orthogonal) scaling equal to 1 (i.e. no scaling). $M_0$ is replaced by $P + \lambda_2 \cdot Q$ or by $\lambda_1 \cdot P + Q\lambda_1 * P + Q$, depending on which direction is chosen. A natural choice would be the direction of greater stretching.

This also gives an alternative approach to the extraction of the magnification component above: both $\lambda_1$ and $\lambda_2$ are replaced by $$\sqrt{det} \text{ which is simply } \sqrt{\lambda_1 \cdot \lambda_2}$$

If there is rotation or skew (i.e. the matrix is not symmetric) one choice is to extract the rotation first and then do the above. Alternatively, the skew may be extracted first, as described below.

In the first instance, we first extract the rotation. The rotation matrix $M_r$ (from EQUATION 2 above) is first determined, and then its inverse calculated. Applying the inverse extracts out the rotation, and now the matrix will be symmetric and the above procedure may be applied. In the end, multiplying by R restores the rotation.

The result is similar if skew is extracted (as described below) instead of rotation. One is faced with two choices: (i) is it rotation or skew that is of interest? And (ii) is it horizontal or vertical skew that is of interest?

7. Extracting Skew

The inverse of the horizontal skew matrix is denoted $S^{-1}_H$.

$$S_H = \begin{pmatrix} 1 & -s \\ 0 & 1 \end{pmatrix}$$

$$S_H^{-1} = \begin{pmatrix} 1 & s \\ 0 & 1 \end{pmatrix}$$

where $$s = \frac{(c-b)}{d}$$

The inverse of the vertical skew matrix is denoted $S^{-1}$

The vertical skew matrix is $$S_V = \begin{pmatrix} 1 & 0 \\ -s & 1 \end{pmatrix}$$

$$S_V^{-1} = \begin{pmatrix} 1 & 0 \\ s & 1 \end{pmatrix}$$

where $$s = \frac{(b-c)}{a}$$

Removing skew (horizontal or vertical) is done using the same approach as in the section above on removing rotation. Applying the inverse skew matrix removes the skew. In the end, the skew matrix S is again applied to restore the skew and get the original matrix with the skew component removed.

8. Applying the Selected Component(s)

Photoshop enables a user to manipulate an electronic image with an onscreen "brush" controlled by an input device such as a mouse. Having extracted the desired component(s) of interest of the local distortion, the extracted component(s) may be applied using such a brush. The selected component(s) of the distortion can be applied under a brush cursor as the user moves the mouse, continuing to do so while a mouse button is pushed. As a result, the affine transform extracted from the initially selected starting point gets applied or "spread" everywhere the mouse goes while the mouse button is pushed.

That application need not be done all at once. It may be done gradually, in small steps. Also, application of the component under the cursor may be stronger (or faster) in the some areas and weaker in others. For example, the simplest implementation is circular brush shape with a circularly symmetric application function, which has a strength of 1 (i.e. fully applies the affine transform) at the center and decays to zero at the edges. Other "shapes" and weighting approaches can be used. For example, the brush shape need not be circular, or a multi-pole brush may be used in which a portion of the cursor applies one component, and another portion of the cursor applies a second component, which could be not only a warping effect, but other effects such as color blending.

Assume the paintbrush is currently at a particular location. The grid is repeatedly scanned under the brush a number of times per second, 30 times per second in one embodiment, and at each grid point under the brush, the current distortion $D_0$ at a point is modified to obtain a new value $$D_{new} = (D_{final} - D)(\text{scalar})$$

Here $D_{final}$ is what the affine distortion is at this point as calculated in equation 1 above and the scalar is the value of the brush weight function.

$D_{final}$ is given by EQUATION 1, where the Displacement at point A is the distortion at the initial click point, and $\vec{V}$ is the vector starting from that initial point and ending at the current point under the paintbrush. This vector now could be very big if the user has moved the mouse far from the starting point as opposed to $\vec{V}$ during extraction of the affine transform at the first click, when it was small.

A number of embodiments of the invention have been described. Nevertheless, it will be understood that various modifications may be made without departing from the spirit and scope of the invention. For example, a variety of surrounding points may be used, different ways of averaging out the calculated affine transform, as well as different numbers of surrounding points may be used. Other approaches may be used for calculating the affine transform. Components may be applied in whole or in part or in various combinations. The affine transform may be additively or subtractively applied, inverted or scaled. Accordingly, other embodiments are within the scope of the following claims.

What is claimed is:

1. A method comprising:
   in response to user action on a canvas, selecting at least one area of a first image which relates to an area on a distortion grid;
   using a plurality of points local to the at least one area to calculate a distortion;
   extracting a rotation component of the distortion, wherein the extracting comprises calculating an affine transform from the plurality of points, the extraction of rotation comprising calculating an angle from the elements of a linear transform matrix; and
   applying the rotation component to a second area of the first image.

2. The method of claim 1 wherein the extracting further comprises decomposing the affine transform into and a translation and a linear transform matrix.

3. The method of claim 1 wherein a user selects the rotation component.

4. The method of claim 3 wherein the user selects the rotation component from a menu displayed on a user interface.

5. The method of claim 1 wherein a user selects the area for the applying by the location of a virtual brush.

6. The method of claim 1 wherein the applying is to an entire image.

7. A method comprising:
   in response to user action on a canvas, selecting at least one area of a first image which relates to an area on a distortion grid;
   using a plurality of points local to the at least one area to calculate a distortion;

extracting a scaling component of the distortion, wherein the extracting comprises calculating an affine transform from the plurality of points, the extraction of scaling comprising calculating a pair of eigenvalues of a linear transform matrix, wherein each eigenvalue represents the amount of scaling in a direction represented by a corresponding projection matrix; and applying the scaling component to a second area of the first image.

8. The method of claim 7 wherein a rotation is removed from the linear transform matrix prior to calculating the pair of eigenvalues.

9. The method of claim 7 wherein a skew is removed from the linear transform matrix prior to calculating the pair of eigenvalues.

10. The method of claim 7 wherein the extracting further comprises decomposing the affine transform into a translation and a linear transform matrix.

11. The method of claim 7 wherein a user selects the scaling component.

12. The method of claim 7 wherein a user selects the area for the applying by the location of a virtual brush.

13. The method of claim 7 wherein the applying is to an entire image.

14. A method comprising:
receiving a selection of one or more distortion components;
receiving a selection of a first area of a first image, the first area relating to an area on a distortion grid, the first area of the first image including a first pre-existing distortion including one or more distortion components;
extracting the one or more selected distortion components from the first pre-existing distortion;
applying the one or more extracted distortion components to a second area of the first image; and
applying the one or more extracted distortion components to a second image.

15. The method of claim 14 wherein the second image is different from the first image.

16. The method of claim 14, where the second area of the first image includes a second pre-existing distortion including one or more distortion components, where the second pre-existing distortion includes fewer distortion components than the first pre-existing distortion, and where applying the one or more extracted distortion components to the second area of the image causes one or more additional distortion components to be added to the second pre-existing distortion.

17. The method of claim 14, where the second area of the first image does not include a pre-existing distortion, and where applying the one or more extracted distortion components to the second area of the first image generates a distortion in the second area of the first image.

18. The method of claim 14, where the second area of the first image includes a second pre-existing distortion including one or more distortion components, where the second pre-existing distortion includes more distortion components than the first pre-existing distortion, and where applying the one or more extracted distortion components to the second area of the image causes one or more distortion components to be subtracted from the second pre-existing distortion.

19. The method of claim 14, where the second image includes a second pre-existing distortion including one or more distortion components, where the second pre-existing distortion includes fewer distortion components than the first pre-existing distortion, and where applying the one or more extracted distortion components to the second image causes one or more additional distortion components to be added to the second pre-existing distortion.

20. The method of claim 14, where the second image does not include a pre-existing distortion, and where applying the one or more extracted distortion components to the second image generates a distortion in the second image.

21. The method of claim 14, where the second image includes a second pre-existing distortion including one or more distortion components, where the second pre-existing distortion includes more distortion components than the first pre-existing distortion, and where applying the one or more extracted distortion components to the second image causes one or more distortion components to be subtracted from the second pre-existing distortion.

22. The method of claim 14, where a user selects the area for the applying by the location of a virtual brush.

23. The method of claim 22, where the virtual brush is weighted.

24. A computer program product, disposed in a computer readable medium, having instructions to cause a computer to:
using a plurality of points surrounding a first area of an image related to an area in a distortion grid, calculate an angular rotation amount of a distortion at the first area;
calculate an affine transform from the plurality of points;
decompose the affine transform into a translation and a linear transform matrix and calculate an angle from the elements of the linear transform matrix; and
apply the angular rotation amount of the distortion to a second area of the image.

25. The computer program product of claim 24 wherein a user selects the angular rotation amount.

26. The computer program product of claim 25 wherein the user selects the angular rotation amount from a menu displayed on a user interface.

27. The computer program product of claim 24 wherein the area for the applying is selected by a user, responsive to the movement of a virtual brush.

28. The computer program product of claim 24 wherein the angular rotation amount is applied to an entire image.

29. A computer program product, disposed in a computer readable medium, having instructions to cause a computer to:
using a plurality of points surrounding a first area of an image related to an area in a distortion grid, calculate a scaling amount of a distortion at the first area;
calculate an affine transform from the plurality of points,
decompose the affine transform into a translation and a linear transform matrix and calculate a pair of eigenvalues of the linear transform matrix, and wherein each eigenvalue represents the amount of scaling in a direction represented by a corresponding projection matrix; and
apply the scaling amount of the distortion to a second area of the image.

30. The computer program product of claim 29 wherein rotation is removed from the linear transform matrix prior to calculating the pair of eigenvalues.

31. The computer program product of claim 29 wherein skew is removed from the linear transform matrix prior to calculating the pair of eigenvalues.

32. The computer program product of claim 29 wherein a user selects the scaling amount.

33. The computer program product of claim 29 wherein the area for the applying is selected by a user, responsive to the movement of a virtual brush.

34. The computer program product of claim 29 wherein the scaling amount is applied to an entire image.

35. A computer program product, disposed in a computer readable medium, having instructions to cause a computer to:
receive a selection of one or more distortion components;

receive a selection of a first area of a first image related to an area in a distortion grid, the first area of the first image including a first pre-existing distortion including one or more distortion components;

extract the one or more selected distortion components from the first pre-existing distortion;

apply the one or more extracted distortion components to a second area of the first image; and apply the one or more extracted distortion components to a second image.

36. The computer program product of claim 35 wherein the second image is different from the first image.

37. The computer program product of claim 35, where the second area of the first image includes a second pre-existing distortion including one or more distortion components, where the second pre-existing distortion includes fewer distortion components than the first pre-existing distortion, and where the instructions to apply the one or more extracted distortion components to the second area of the image causes one or more additional distortion components to be added to the second pre-existing distortion.

38. The computer program product of claim 35, where the second area of the first image does not include a pre-existing distortion, and where the instructions to apply the one or more extracted distortion components to the second area of the first image generates a distortion in the second area of the first image.

39. The computer program product of claim 35, where the second area of the first image includes a second pre-existing distortion including one or more distortion components, where the second pre-existing distortion includes more distortion components than the first pre-existing distortion, and where the instructions to apply the one or more extracted distortion components to the second area of the image causes one or more distortion components to be subtracted from the second pre-existing distortion.

40. The computer program product of claim 35, where the second image includes a second pre-existing distortion including one or more distortion components, where the second pre-existing distortion includes fewer distortion components than the first pre-existing distortion, and where the instructions to apply the one or more extracted distortion components to the second image causes one or more additional distortion components to be added to the second pre-existing distortion.

41. The computer program product of claim 35, where the second image does not include a pre-existing distortion, and where the instructions to apply the one or more extracted distortion components to the second image generates a distortion in the second image.

42. The computer program product of claim 35, where the second image includes a second pre-existing distortion including one or more distortion components, where the second pre-existing distortion includes more distortion components than the first pre-existing distortion, and where the instructions to apply the one or more extracted distortion components to the second image causes one or more distortion components to be subtracted from the second pre-existing distortion.

43. The computer program product of claim 35, where a user selects the area for the applying by the location of a virtual brush.

44. The computer program product of claim 43, where the virtual brush is weighted.

45. A computer program product having instructions stored in a computer readable medium, containing instructions to cause a computer to:

display a first image on a canvas, the first image being related to an area on a distortion grid;

responsive to an input device controlled by a user, select an area of the first image, the selected area of the first image including a first pre-existing distortion including one or more distortion components;

responsive to a selection by the user from a menu of one or more distortion components, extract at least one selected distortion component of the pre-existing distortion from the selected area of the first image;

responsive to movement and location of a cursor controlled by the user, apply the at least one extracted distortion component to a second area of the first image; and responsive to movement and location of a cursor controlled by the user, apply the at least one extracted distortion component to a second image.

46. The computer program product of claim 45 wherein the second image is different from the first image.

47. The computer program product of claim 45, where the second area of the first image includes a second pre-existing distortion including one or more distortion components, where the second pre-existing distortion includes fewer distortion components than the first pre-existing distortion, and where the instructions to apply the one or more extracted distortion components to the second area of the image causes one or more additional distortion components to be added to the second pre-existing distortion.

48. The computer program product of claim 45, where the second area of the first image does not include a pre-existing distortion, and where the instructions to apply the one or more extracted distortion components to the second area of the first image generates a distortion in the second area of the first image.

49. The computer program product of claim 45, where the second area of the first image includes a second pre-existing distortion including one or more distortion components, where the second pre-existing distortion includes more distortion components than the first pre-existing distortion, and where the instructions to apply the one or more extracted distortion components to the second area of the image causes one or more distortion components to be subtracted from the second pre-existing distortion.

50. The computer program product of claim 45, where the second image includes a second pre-existing distortion including one or more distortion components, where the second pre-existing distortion includes fewer distortion components than the first pre-existing distortion, and where the instructions to apply the one or more extracted distortion components to the second image causes one or more additional distortion components to be added to the second pre-existing distortion.

51. The computer program product of claim 45, where the second image does not include a pre-existing distortion, and where the instructions to apply the one or more extracted distortion components to the second image generates a distortion in the second image.

52. The computer program product of claim 45, where the second image includes a second pre-existing distortion including one or more distortion components, where the second pre-existing distortion includes more distortion components than the first pre-existing distortion, and where the instructions to apply the one or more extracted distortion components to the second image causes one or more distortion components to be subtracted from the second pre-existing distortion.

53. The computer program product of claim 45, where a user selects the area for the applying by the location of a virtual brush.

54. The computer program product of claim 53, where the virtual brush is weighted.

55. A system comprising:
a user input device, a display, a memory device, and a programmable processor configured to perform operations including:
in response to user action on a canvas, selecting at least one area of a first image which relates to an area on a distortion grid;
using a plurality of points local to the at least one area to calculate a distortion;
extracting a rotation component of the distortion, wherein the extracting comprises calculating an affine transform from the plurality of points, the extraction of rotation comprising calculating an angle from the elements of a linear transform matrix; and
applying the rotation component to a second area of the first image.

56. The system of claim 55, wherein the extracting further comprises decomposing the affine transform into a translation and a linear transform matrix.

57. The system of claim 55, wherein a user selects the rotation component.

58. The system of claim 57, wherein the user selects the rotation component from a menu displayed on a user interface.

59. The system of claim 55, wherein a user selects the area for the applying by the location of a virtual brush.

60. The system of claim 55, wherein the applying is to an entire image.

61. A system comprising:
a user input device, a display, a memory device, and a programmable processor configured to perform operations including:
in response to user action on a canvas, selecting at least one area of a first image which relates to an area on a distortion grid;
using a plurality of points local to the at least one area to calculate a distortion;
extracting a scaling component of the distortion, wherein the extracting comprises calculating an affine transform from the plurality of points, the extraction of scaling comprising calculating a pair of eigenvalues of a linear transform matrix, wherein each eigenvalue represents the amount of scaling in a direction represented by a corresponding projection matrix; and
applying the scaling component to a second area of the first image.

62. The system of claim 61, wherein a rotation is removed from the linear transform matrix prior to calculating the pair of eigenvalues.

63. The system of claim 61, wherein a skew is removed from the linear transform matrix prior to calculating the pair of eigenvalues.

64. The system of claim 61, wherein the extracting further comprises decomposing the affine transform into a translation and a linear transform matrix.

65. The system of claim 61, wherein a user selects the scaling component.

66. The system of claim 61, wherein a user selects the area for the applying by the location of a virtual brush.

67. The system of claim 61, wherein the applying is to an entire image.

68. A system comprising:
a user input device, a display, a memory device, and a programmable processor configured to perform operations including:
receiving a selection of one or more distortion components;
receiving a selection of a first area of a first image, the first area relating to an area on a distortion grid, the first area of the first image including a first pre-existing distortion including one or more distortion components;
extracting the one or more selected distortion components from the first pre-existing distortion;
applying the one or more extracted distortion components to a second area of the first image; and
applying the one or more extracted distortion components to a second image.

69. The system of claim 68, wherein the second image is different from the first image.

70. The system of claim 68, where the second area of the first image includes a second pre-existing distortion including one or more distortion components, where the second pre-existing distortion includes fewer distortion components than the first pre-existing distortion, and where applying the one or more extracted distortion components to the second area of the image causes one or more additional distortion components to be added to the second pre-existing distortion.

71. The system of claim 68, where the second area of the first image does not include a pre-existing distortion, and where applying the one or more extracted distortion components to the second area of the first image generates a distortion in the second area of the first image.

72. The system of claim 68, where the second area of the first image includes a second pre-existing distortion including one or more distortion components, where the second pre-existing distortion includes more distortion components than the first pre-existing distortion, and where applying the one or more extracted distortion components to the second area of the image causes one or more distortion components to be subtracted from the second pre-existing distortion.

73. The system of claim 68, where the second image includes a second pre-existing distortion including one or more distortion components, where the second pre-existing distortion includes fewer distortion components than the first pre-existing distortion, and where applying the one or more extracted distortion components to the second image causes one or more additional distortion components to be added to the second pre-existing distortion.

74. The system of claim 68, where the second image does not include a pre-existing distortion, and where applying the one or more extracted distortion components to the second image generates a distortion in the second image.

75. The system of claim 68, where the second image includes a second pre-existing distortion including one or more distortion components, where the second pre-existing distortion includes more distortion components than the first pre-existing distortion, and where applying the one or more extracted distortion components to the second image causes one or more distortion components to be subtracted from the second pre-existing distortion.

76. The system of claim 68, where a user selects the area for the applying by the location of a virtual brush.

77. The system of claim 76, where the virtual brush is weighted.

* * * * *

UNITED STATES PATENT AND TRADEMARK OFFICE
CERTIFICATE OF CORRECTION

PATENT NO.         : 7,411,595 B2
APPLICATION NO. : 09/996200
DATED                : August 12, 2008
INVENTOR(S)       : Todor G. Georgiev It is certified that error appears in the above-identified patent and that said Letters Patent is hereby corrected as shown below:

On the Cover Page -- OTHER PUBLICATIONS:
    right column, line 8:
        delete "interfaceansoftware", and replace with --interface software-- right column, line 9:
        insert --and-- before "technology"

right column, line 21:
        delete "Theory-of", and replace with --Theory of--

Claim 2:
    column 8, line 51:
        delete "into and a", and replace with --into a--

Signed and Sealed this

Seventeenth Day of February, 2009

JOHN DOLL
*Acting Director of the United States Patent and Trademark Office*